United States Patent [19]

Burkhardt

[11] Patent Number: 4,841,726
[45] Date of Patent: Jun. 27, 1989

[54] GAS TURBINE JET ENGINE OF MULTI-SHAFT DOUBLE-FLOW CONSTRUCTION

[75] Inventor: Claus Burkhardt, Eching, Fed. Rep. of Germany

[73] Assignee: MTU-Munchen GmbH, Munich, Fed. Rep. of Germany

[21] Appl. No.: 932,280

[22] Filed: Nov. 19, 1986

[30] Foreign Application Priority Data

Nov. 19, 1985 [DE] Fed. Rep. of Germany ....... 3540943

[51] Int. Cl.[4] .............................................. F02K 3/06
[52] U.S. Cl. .................. 60/226.1; 60/39.75; 416/95; 415/116; 415/175; 415/180
[58] Field of Search ............... 60/226.1, 262, 39.83, 60/39.07, 39.75, 39.161; 416/95; 415/116, 117, 175, 180

[56] References Cited

U.S. PATENT DOCUMENTS

| | | | |
|---|---|---|---|
| 3,108,767 | 10/1963 | Eltis et al. | 60/226.1 |
| 3,365,172 | 1/1968 | McDonough et al. | 416/95 |
| 3,583,824 | 6/1971 | Smuland | 415/117 |
| 3,975,901 | 8/1976 | Hallinger et al. | 415/117 |
| 4,023,919 | 5/1977 | Patterson | 415/134 |
| 4,069,662 | 1/1978 | Redinger et al. | 60/226 |
| 4,217,755 | 8/1980 | Williams | 416/95 |
| 4,271,666 | 6/1981 | Hurley et al. | 60/226.1 |
| 4,304,093 | 12/1981 | Schulze | 60/39.29 |
| 4,337,016 | 6/1982 | Chaplin | 415/116 |
| 4,338,061 | 7/1982 | Beitler et al. | 415/1 |
| 4,474,001 | 10/1984 | Griffin et al. | 60/226.1 |
| 4,541,775 | 9/1985 | Hovan | 416/95 |
| 4,576,547 | 3/1986 | Weiner et al. | 415/175 |

FOREIGN PATENT DOCUMENTS

| | | |
|---|---|---|
| 2654300 | 6/1977 | Fed. Rep. of Germany . |
| 1372176 | 8/1964 | France .................................. 60/262 |
| 695482 | 8/1953 | United Kingdom . |

Primary Examiner—Donald E. Stout
Attorney, Agent, or Firm—Barnes & Thornburg

[57] ABSTRACT

A gas turbine jet propulsion unit of multi-shaft-double-flow construction in which a front compressor or fan supplies compressed air into a secondary channel arranged coaxially to the propulsion unit axis and formed between outer and inner wall structures, from which a secondary air component is taken and blown out against the turbine housing structures for purposes of turbine component cooling; the secondary air channel extends essentially over the entire propulsion unit length or at least up to the area near the turbine housing structure while the secondary air component is taken off from the secondary flow by way of openings in the inner wall structure which are arranged in direct proximity of the respective turbine housing structure.

32 Claims, 8 Drawing Sheets

GAS TURBINE JET ENGINE OF MULTI-SHAFT DOUBLE-FLOW CONSTRUCTION

The present invention relates to a gas turbine jet engine of multi-shaft, double-flow construction in which a front compressor or fan supplies compressed air into a secondary channel arranged coaxially to the propulsion unit axis and constructed between outer and inner wall structures, from which a secondary air component is taken and is blown intentionally aimed or directed against turbine housing structures for the purpose of cooling turbine components.

With such jet propulsion units designated also as "by-pass jet engines", the housings of temperature-loaded components are cooled, respectively, the radial gaps between the rotor blade tips and associated running-in coatings of the housing as well as axial movements of the guide blades are controlled: this takes place by means of impact cooling.

In a propulsion unit concept disclosed, for example, in the DE-OS No. 26 54 300, cooling air which is taken downstream of the front blower (fan) from the secondary flow, is to be conducted, by way of pipe lines to the respective component (high and/or low pressure turbine) and is to be conducted by way of a complex system of distributor lines to the blow lines, out of which the cooling air can be blown against the respective component housings by way of impact cooling holes.

The disadvantages of this known concept are as follows:
high manufacturing costs,
additional weight,
costly assembly owing to complicated construction,
with necessarily smaller dimensioning of the pipes (weight), poor circumferential distribution of the cooling air (pressure, respectively, branching losses from hole to hole within a pipe),
increased defect as failure possibility (broken pipe line),
small potential for the subsequent increase of the heat transfer because an originally selected pipe cross section permits an increase of the cooling air quantity only with acceptance of a poorer circumferential distribution.

The present invention is concerned with the task to provide a gas turbine jet propulsion unit of the type mentioned hereinabove, in which the turbine housing cooling air can be taken from the secondary air stream without complex and costly pipe distribution systems free of breakdown failures and can be blown out highly efficiently against the respective turbine housing structures.

The underlying problems are solved according to the present invention in that the secondary air channel extends essentially over the entire propulsion unit length, and in that the secondary air component is taken from the secondary stream by way of openings in the inner wall structure of the secondary channel which are located in direct proximity of the respective turbine housing structure.

The disadvantages mentioned in connection with the pior art propulsion unit conception according to the DE-OS No. 26 54 300 can be eliminated with the solution of the present invention in a comparatively simple manner. Within the scope of the present invention, for purposes of a highly efficient cooling, for example, of the housing of the low pressure turbine, the necessarily already present inner wall structure of the auxiliary stream, respectively, secondary channel, can be far-reachingly matched as regards its axial course to the outer contour of the low pressure housing, and more particularly with a vertical spacing from the housing which lies far-reachingly within the range of the optimum as regards the heat transfer by an impact cooling. The manufacture should pose no difficulties because the secondary channel is constructed of two-shells in order to enable a rapid access to the propulsion unit during the service. Thus, rows of blow-out air bores can be provided along the circumference at the respective axial height of the housing area which is to be preferredly cooled. The low Pressure turbine housing can thus be supplied at every location with more or less air symmetrically or asymmetrically with respect to rotation, if desired, depending on the number, respectively, cross section of the bores or sots. The feed pressure at the impact cooling bores, even though it involves the static pressure of the secondary channel, at the level is thereby approximately equal to the more customary propulsion unit concept as disclosed, for example, in the DE-OS No. 26 54 300 in which the total pressure at the fan outlet is utilized or even slightly higher because the pressure losses that occur in the prior art in the feed-, distribution- and blow-out lines, as cause thereof can be avoided according to the present invention.

It is far-reachingly a feature of every active radial gap control (Active Clearance Control) that at least two cooling air quantities are available (insofar as one operates with air), namely, a small quantity, respectively, the quantity zero and a quantity which is designed for the system. Depending on the type of construction, however, for the most part for a short period of time during the acceleration, respectively, re-acceleration of a propulsion unit, the impact cooling must not be effective in order to avoid an undesired running-in of the rotor blades into the housing linings. With hitherto known systems for the active clearance control, the air quantity is turned off, respectively, reduced for a short period of time by a valve. In order not to drive up the cost too high, one frequently accepts the shifting positions "on" and "off". A valve control of this type as function of the propulsion unit condition is already described in the aforementioned DE-OS No. 26 54 300.

The present invention provides, inter alia. a solution by means of which the danger of occurrences of excessively hard blade contact which takes place during the acceleration or re-acceleration of the propulsion unit for short periods of time, can be barred with extraordinarily simple and effective means in that the highly effective impact cooling system does not need to be changed functionally-mechanically, respectively, the impact cooling system after an interruption during a relatively short period of time (for example, about 30 to 50 seconds) can operate again within the frame of its "normal" design during the propulsion unit acceleration (start-climbing phase) or re-acceleration of the propulsion unit.

Consequently, during the period of time during which the impact cooling is to be ineffectual, by-pass air can be conducted, for example, by means of at least one opened valve into the space between the secondary flow channel inner wall and the housing outer wall, i.e., into the space in which the impact cooling acts in order to create a pressure equalization and thus to far-reachingly prevent a through-flow through the impact cooling bores.

The present invention thereby starts from the general technical consideration that during an acceleration of the propulsion unit, the response behavior of the rotor blades, in this case, for example, of the low pressure turbine, takes place very rapidly (rapid expansion) whereas the associated housing only follows with delay by reason of the larger mass, respectively, "lags behind" in time with respect to the thermal expansion. As a result thereof, the respective turbine rotor blade gaps are reduced very strongly up to a running-in into the sealing lining; if the radial gap control air, respectively, impact air (ACC-air) were fully effective already from the beginning of the acceleration, then the expansion of the housing would be still further delayed so that it would lead to a reinforced running-in into the sealing linings which in the least leads to a relatively strong wear of the rotor blade tips, respectively, of the rotor blade tip end seals on the one side as also of the corresponding running-in lining at the housing on the other side. A hard seal running-in operation, for example, in the start-climbing phase, which normally is to be expected at the beginning of a propulsion unit acceleration phase within the frame of a time range of seconds, specific to the propulsion unit, can therefore be avoided by the use of the valve function and valve arrangement, for example, of the "first" or "further" valves or by the use of the shifting cycle combination of the "first" and "second" valves as will be described more fully hereinafter. Notwithstanding an impact cooling interruption which is brief from the point of view of time, a relatively "mild" cooling, for example, of the low pressure turbine housing, can remain assured by the present invention.

These and other objects, features and advantages of the present invention will become more apparent from the following description when taken in connection with the accompanying drawing which shows, for purposes of illustration only, several embodiments in accordance with the present invention, and wherein.

Figure 1:
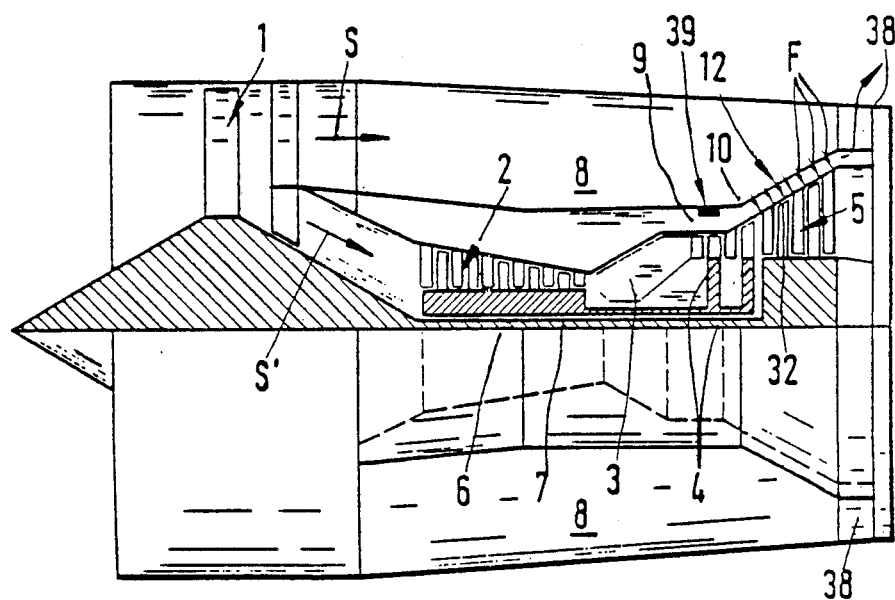
FIG. 1 is a longitudinal cross-sectional view of a schematically illustrated gas turbine jet propulsion unit in accordance with the present invention which is a full cross section in the longitudinal direction along the upper half and only partly in cross section along the lower half.
Figure 3:
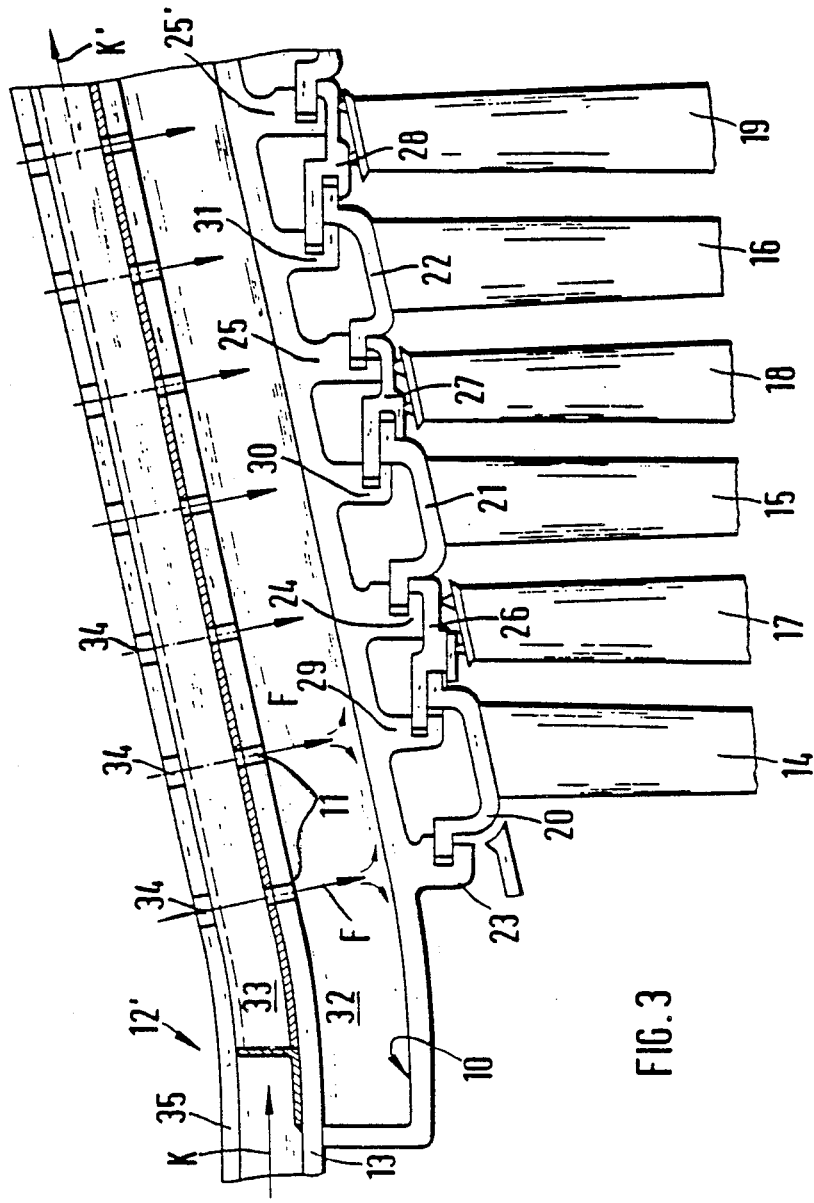
FIG. 3 is a partial longitudinal cross-sectional view of a modified embodiment of FIG. 2 in which the respective inner wall structure section is constructed double-walled with the inclusion of air distributor channels for the impact cooling.
Figure 8:
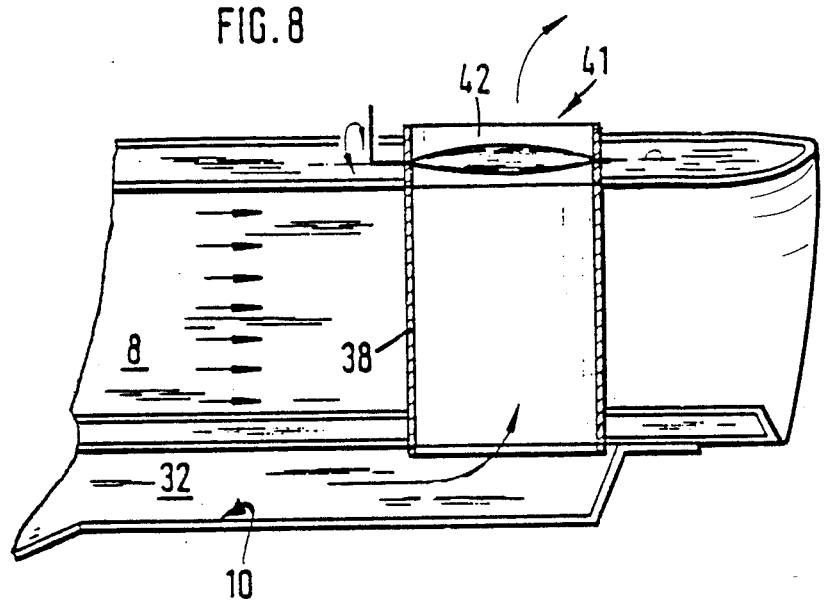
FIG. 8 is a partial longitudinal cross-sectional view through a secondary and ring channel end section of the propulsion unit in accordance with the present invention including a hollow support blade and a second valve integrated into the latter which is constructed as flap valve matched to the inner geometry of the blade.
Figure 9:
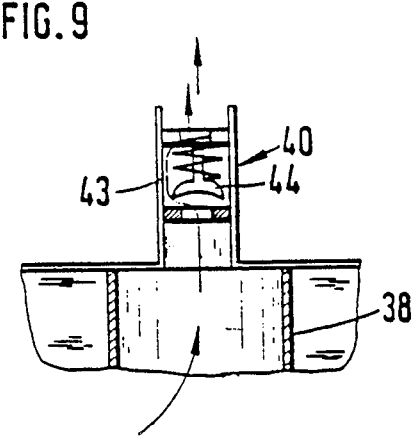
Figure 10:
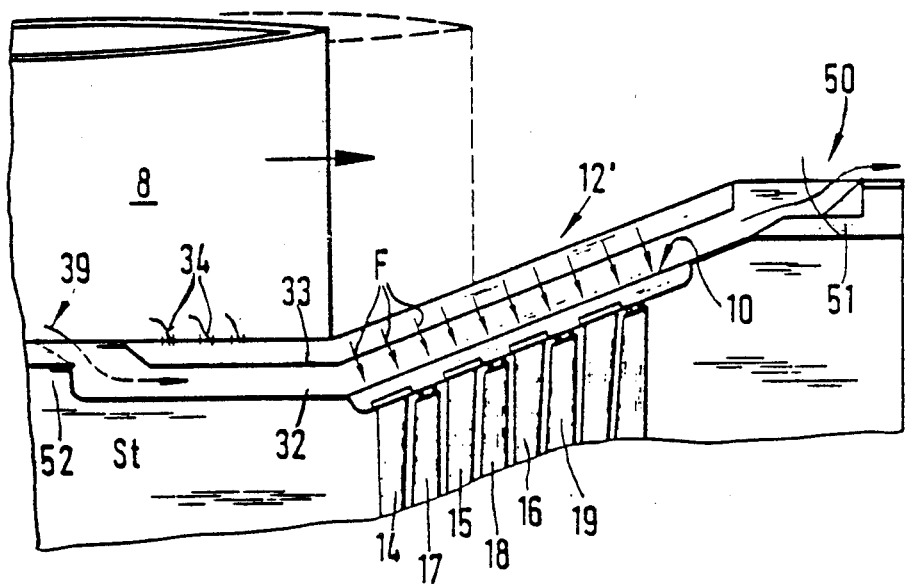

FIG. 9 is a partial cross-sectional view, similar to FIG. 8, of still another modified embodiment of a second valve in accordance with the present invention arranged at the outer end of the support blade inside of a pipe line section; and FIG. 10 is a partial schematic longitudinal cross-sectional view through a propulsion unit section illustrating the low pressure turbine housing cooling system with a secondary channel constructional length shortened compared to FIG. 1 as well as with the inclusion, for example, of components of FIG. 3.

Referring now to the drawing wherein like reference numerals are used throughout the various views to designate like parts, and more particularly to FIG. 1, this figure illustrates a gas turbine jet propulsion unit of double flow construction suitable for the application of the present invention. This gas turbine jet propulsion unit consists in the sequence—from left to right—of a front fan 1, of a high pressure compressor 2, of an annular combustion chamber 3, of a high pressure compressor drive turbine 4 and of a low pressure turbine 5 for the drive of the front fan 1 which is aerodynamically connected behind (downstream) of the turbine 4.

The front fan 1 is thereby coupled with the low pressure turbine 5 by way of a common inner rotor system 6. In the high pressure or gas producer part, the high pressure compressor 2 and the associated compressor drive turbine 4 are coupled with each other by way of a common rotor system 7. The rotor system 7 thereby surrounds coaxially a part of the rotor system 6. The principal part of the air stream supplied by the front fan 1 (by-pass or secondary air stream S) is fed into the secondary channel 8 of the propulsion unit for producing the propulsion thrust while a remaining part S' of the air stream supplied by the front fan 1 reaches the high pressure compressor 2 of the gas producer. The hot gas stream which escapes from the low pressure turbine 5 is also utilized for producing the propulsion thrust.

Normally in such propulsion units significant turbine components must be cooled for controlling the hot gas temperature, for example, the inlet guide blades of the high pressure turbine 4 would have to be able to be cooled, additionally, for example, the guide blades of the high pressure turbine 4 as possibly also, for example, the rotor blades of the second stage of the high pressure turbine 4. The compressor air to be used for the mentioned cooling cases of the high pressure turbine 4 can be taken at one or several suitable places out of the high pressure compressor 2 and can be conducted, for example, by way of the respective inner rotor system to the corresponding utilization purpose. It is known to attack with cooling air the respective ring-shaped housing structures 9, respectively, 10 of the high pressure and low pressure turbines 4, respectively, 5 by way of relatively costly and complicated pipe distribution systems, with the cooling air taken from the secondary channel of the propulsion unit.

The present invention avoids the disadvantages entailed by such known propulsion unit concepts (inter alia, high structural expenditures, possible failure likelihoods, high pressure losses) in that the secondary channel extends essentially over the entire propulsion unit length, and a secondary air component used for purposes of turbine component cooling and rotor gap optimization is taken from the secondary stream by way of openings 11 (see also FIG. 2) in the inner wall structure generally designated by reference numeral 12 of the secondary channel 8, with the openings 11 arranged in direct proximity of the respective turbine housing structure associated in this case, for example, to with the low pressure turbine 5 and is blown out against the turbine housing structure 10 along the path of an impact cooling (arrows F).

In contrast to the modifications of the present invention to be described more fully hereinafter, one starts initially as regards FIGS. 1 and 2 with the concept that the inner wall structure 12 of the secondary channel 8 may be constructed as a simple single wall 13 whereby the openings 11 are therefore constructed at the same time as take-off air openings and blow-out openings.

Figure 2:
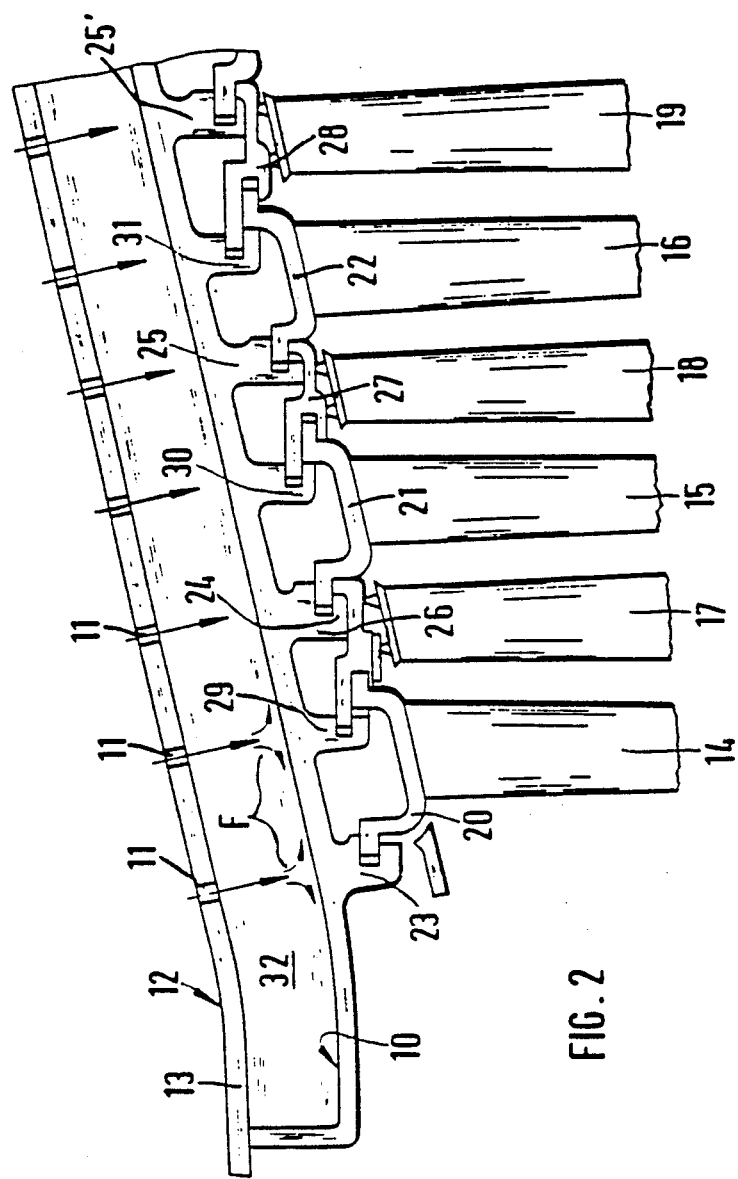
FIG. 2 is a partial longitudinal cross-sectional view of an inner wall structure section of the secondary channel according to this invention which is constructed for the simultaneous secondary air removal and cooling air blow-out or discharge in association with a partially broken off low pressure turbine housing section in addition to the associated turbine guide and rotor blades.
Figure 4:
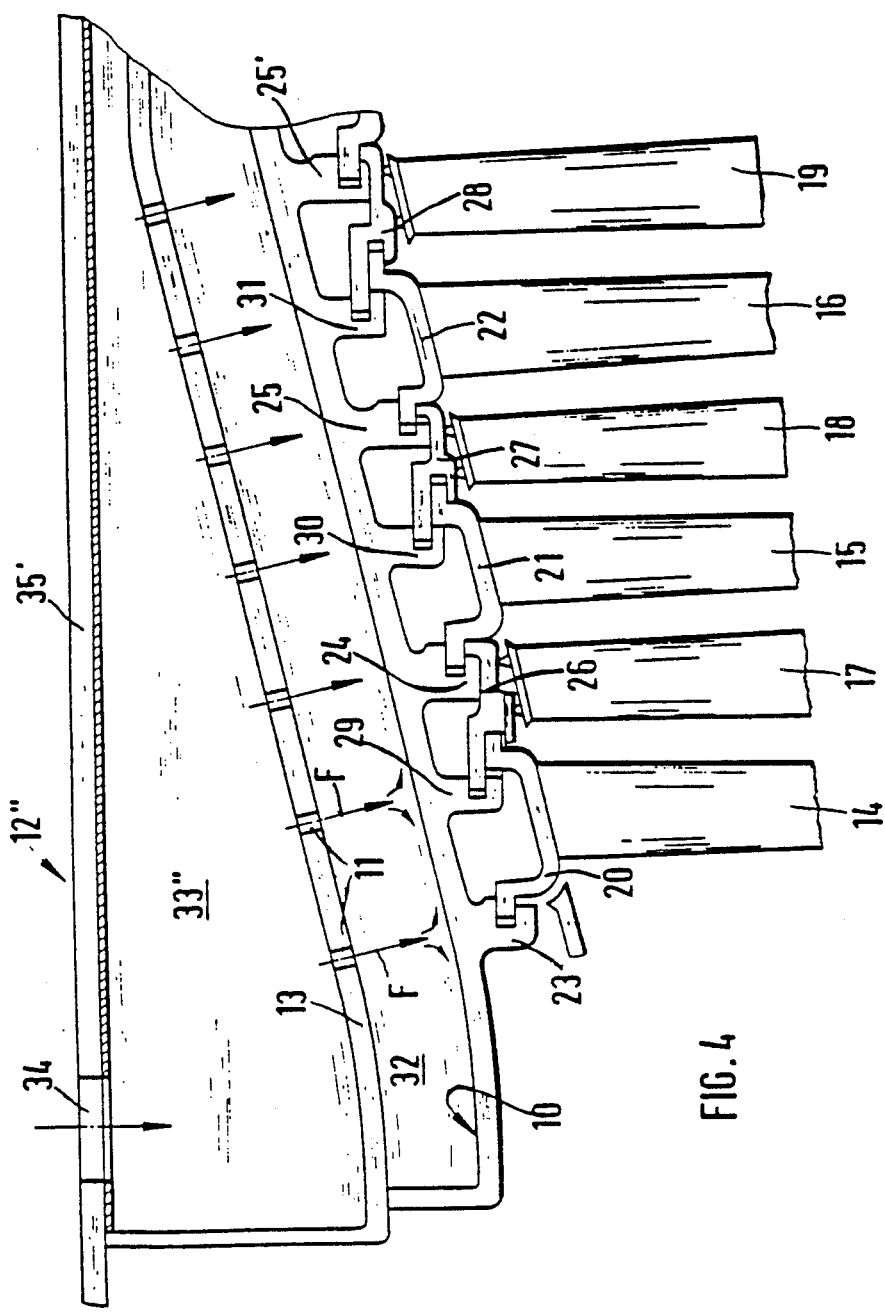
FIG. 4 is a partial longitudinal cross-sectional view, similar to FIGS. 2 and 3, of a still further modified embodiment in accordance with the present invention in which the respective inner wall structure section is not only constructed double-walled with the inclusion of air guide and/or distributor chambers but also wedge-shaped—as viewed in longitudinal cross section.

With respect to the low pressure turbine 5 only schematically indicated in FIG. 1, FIGS. 2, 3, and 4 embody detailed information of a comparable low pressure turbine whereby the corresponding components in FIGS. 2, 3 and 4 are designated by the same reference numerals; the guide blades of three successive turbine stages are therefore sequentially designated in these figures by reference numerals 14, 15 and 16, and the associated rotor blades by reference numerals 17, 18 and 19. On the left side base or foot segments 20, 21 and 22 which are associated with the guide blades 14, 15 and 16 are each suspended on hooks 23, 24 and 25 of the turbine housing 10. On the right side, the base or foot segments 20, 21 and 22 are each suspended at sealing segment carriers 26, 27 and 28 surrounding the rotor blade cover tape sealing tips; the seal segment carriers 26, 27 and 28 are suspended, on the one hand, on housing hooks 29, 30 and 31 and on the other are wedged-in between the ends of the housing hooks, for example, 24 and 25 as well as the adjoining sections of the foot or base segments, for example, 21 and 22.

According to FIG. 2, the respective impact cooling flow F is therefore intentionally directed onto the respective hooks 23, 29, 24, 30, 25, 31, respectively, 25' so that the components with specific largest mass of the turbine housing structure 10, which exist by reason of the hook construction, can be intensively included into the cooling process; furthermore, inter alia. the maintenance of constant and minimum rotor blade radial gaps is to be enhanced.

The openings 11 (FIG. 2) terminate in an annular space 32 formed between the single wall 13 of the inner wall structure 12 of the secondary channel 8 (FIG. 1) and the turbine housing structure 10.

Figure 5:
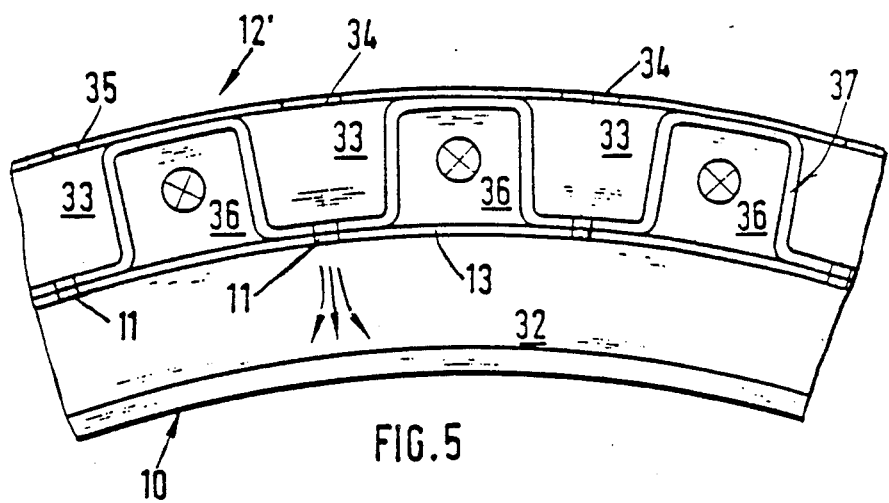
FIG. 5 is a partial transverse cross-sectional view of a first embodiment of a section of a double-walled inner wall structure section in accordance with the present invention with air distributor and air guide chambers successively following one another, with a coordination to the low pressure turbine housing corresponding to the radial distance.

According to FIGS. 3 and 5, the inner wall structure 12' of the secondary channel is to be constructed double-walled with the inclusion of air distributor chambers 33; the inner wall structure 12' of the secondary channel 8 therefore consists of an outer wall 35 containing the openings 34 for the secondary air take-off and an inner wall 13 containing the impact cooling bores 11. Openings 34 (FIG. 3) and bores 11 may, but need not, be arranged one above the other in the respective radial impact planes 9 (see also FIG. 4). In a concrete realization according to FIG. 5, the inner wall structure 12' of the secondary channel 8 is constructed thereat double-walled with the inclusion of air distributor chambers 33 and air guide chambers 36 separated from one another in the circumferential direction and alternately following one another, of which the air guide chambers 36 are constructed for the separate guidance of air components, taken from the propulsion circulatory process at other locations (arrow K—FIG. 3), in the direction K' onto a propulsion unit zone located further downstream. For example, air utilized beforehand for the high pressure turbine cooling can be further conducted by way of the air guide chambers 36 as exhaust air and can be supplied for to other purposes, for example, as bearing chamber air or blocking sealing air. Furthermore, acoording to FIG. 5, the air guide chambers 36 and the air distributor chambers 33 can be constructed as preformed profile strips 37 constructed as wall-reinforcing spacer members between the outer and inner walls 35 and 13 and continuously undulated U-shaped in a suitable manner in the circumferential direction; in this case, the impact cooling bores 11 can be extended through sections of the profile strips 37 forming the air distributor chambers 33.

Figure 6:
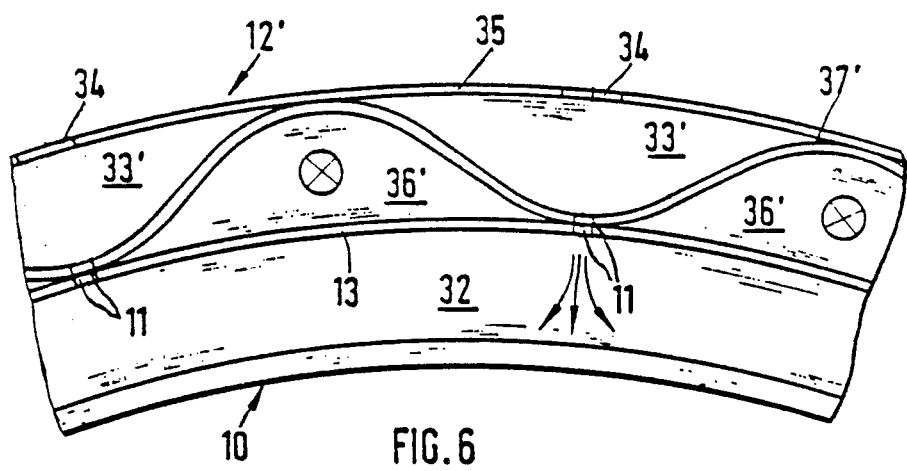
FIG. 6 is a partial transverse cross-sectional view, similar to FIG. 5 of a modified embodiment in accordance with the present invention of air distributor and air guide chambers constructed in alternating sequence.

The embodiment according to FIG. 6 is conceived on the basis of the same technical functional conditions as FIG. 5 but differs from FIG. 5 by the use of a profile strip 37' of uniformly undulated shape over the circumference and constructed softly curved, which causes the creation in alternate sequence of mutually separate air distributor chambers 33' and air guide chambers 36.

Insofar as the turbine housing structure 10 to be cooled has a relatively pronounced diverging contour in the direction of the propulsion unit main flow—as illustrated in FIG. 4—it may be extraordinarily advantageous that the secondary air take-off and cooling section of the inner wall structure 12" of the secondary air channel 8 is constructed wedge-shaped as viewed in longitudinal cross section, bridging the divergence angle in that the respective inner wall 13 according to FIG. 2, as before extends parallel to the respective divergent part of the outer turbine housing structure 10 while the respective outer wall 35' extends parallel to the propulsion unit axis. Notwithstanding existing local secondary air take-off—and cooling air preparation criteria for the purpose of a highly efficient impact cooling—it is thus feasible to construct the inner wall structure 12" of the secondary channel 8 smooth-surfaced completely satisfactorily aerodynamically over the respective outer wall 35' with a view to the requisite propulsion unit design. Differing from FIG. 3, FIG. 4 illustrates only secondary air take-off openings 34 which are arranged upstream and are dimensioned correspondingly large.

Figure 7:
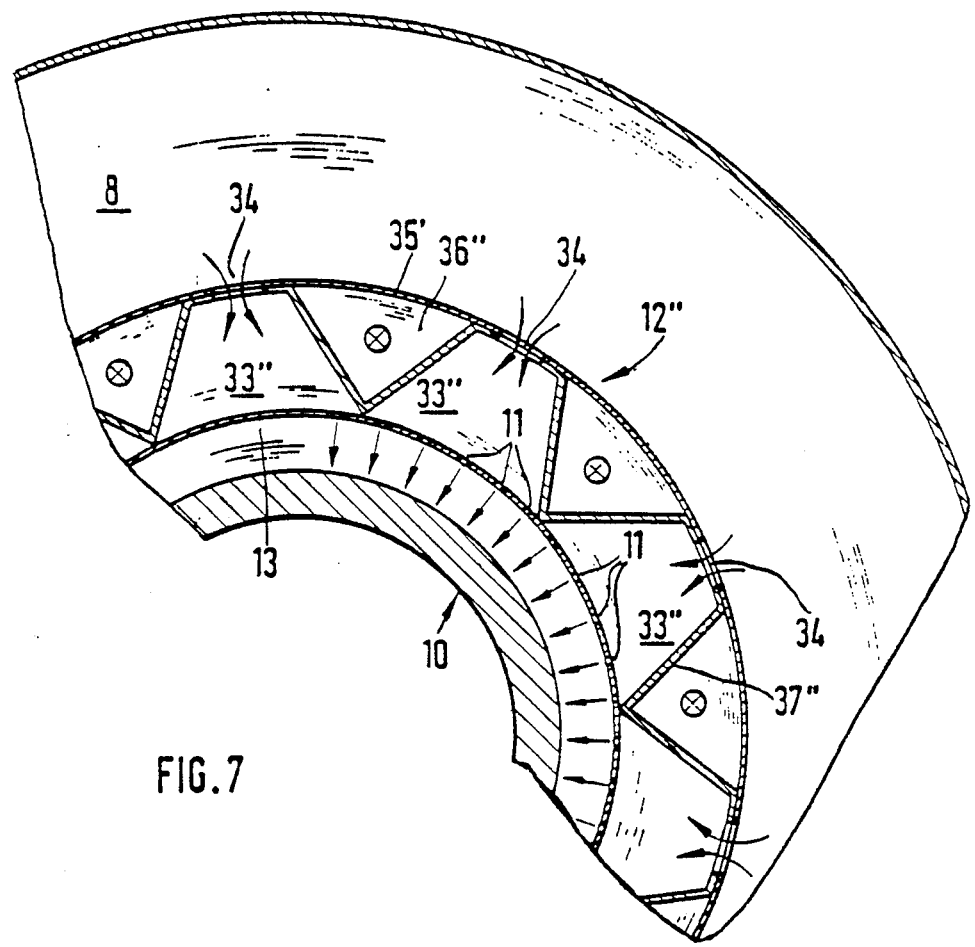
FIG. 7 is a partial transverse cross-sectional view, similar to FIGS. 5 and 6, of a still further modified embodiment in accordance with the present invention with air distributor and air guide chambers constructed in alternating sequence which is suitable for the arrangement of FIG. 4.

FIG. 7 illustrates a cross section of the secondary channel 8 including the wedge-shaped double-walled inner wall structure 12" of the secondary channel according to FIG. 4 whereby in this case essentially continuously V-shaped undulated profile strips 37″ are provided which also form in that case continuously alternating air distributor chambers 33″ and air guide chambers 36″ that are separated from one another. As with the preceding embodiments according to FIGS. 5 and 6, it would be quite possible also for FIG. 7 to provide exclusively air distributor chambers serving for the optimal impact cooling preparation. The construction according to FIG. 7 makes it possible to provide a relatively large number of small impact cooling bores 11 per unit area in the inner wall 13 of the inner wall structure 12″, and more particularly in the sense of a sieve-hole-like construction. FIG. 6 could be adapted in a similar manner to FIG. 7 in that the chambers designated in FIG. 6 as "air guide chambers 36‴" are constructed as air distributor chambers, as a result of which a relatively large impact cooling bore surface could be made available along the inner wall 13.

According to the present invention, the possibility also exists to arrange the aforementioned impact cooling bores 11, depending on requirement, uniformly or nonuniformly distributed with respect to the corresponding construction of the turbine housing and the thermal expansion criteria to be expected during operation.

As can be further seen from FIG. 1, the downstream end of the respective annular space 32—between the respective turbine housing structure 10 and the inner wall structure 12 of the secondary channel 8—may be open against the atmosphere by way of hollow air guide bodies projecting through the secondary channel, for example, by way of support blades 38 in order to assure an unimpaired discharge of the used-up cooling air unimpaired with respect to the secondary flow. The arrangement and construction of the hollow support blades 38 can be seen in detail from FIG. 8.

In order to be able not to render fully operable the described impact cooling in the sense already mentioned hereinabove during a propulsion unit acceleration—or re-acceleration phase for a short period of time (danger of hard blade contact conditions)—the present invention provides at the inner wall structure 12 of the secondary channel 8 at least one first valve 39 (FIGS. 1 and 10) connected ahead of the annular space 32, responsible for the impact cooling, by means of which secondary air is taken from the secondary channel 8 and conducted to the annular space 32 for the brief interruption of the impact cooling.

A comparable or still more intensive impact cooling interruption effect in the way of a brief counter pressure build-up in the annular space 32, for example, with a configuration according to FIGS. 3 or 4, would also be possible in that in lieu of the aforementioned first valve 39, at least a second valve 41 (FIG. 8) is provided. According to FIG. 8, the aforementioned second valves 41 can be integrated therefore into the air guide members or support blades 38; the valves 41 thereby have a respective closure valve profile 42 matched to the elliptical inner contour of the hollow support blades 38; by reason of the pivoting about the through-flow cross section of a support blade 38 can be closed off completely or—according to the valve end position shown in FIG. 8—opened up in order to blow out into the atmosphere the used-up cooling and control air $F_{ACC}$. Constructed as flap-like closure valves, respective second valves could also be arranged locally—between the annular space 32 and, for example, the support blades 38—in such a manner that they enable in a first end position the air flow out of the annular space 32 into the support blades 38 and in a second end position close off the blade through-flow cross section. Downstream of the support blades 38, the respective annular space 32 would thereby always have to be considered as closed (FIG. 8).

In lieu of a construction in the form of closure valves, the first and/or second valves could also be constructed as annular slide valve members adjustable axially or in the circumferential direction which are provided with through-flow openings that are aligned in a first end position of the annular slide valve member (open position) with housing openings are closed off and in a second end position. The first and/or second valves, however, may also be constructed as spring-disk valves. Reference is made in that connection to FIG. 9, in which, for example, the respective second valve 40 is constructed as spring disk valve and is arranged in a cylindrical pipe guidance 43 which adjoins the support blades 38 laterally on the outside thereof the support blades 38. FIG. 9 illustrates the opened valve position in which the valve disk 44 spring-loaded by a return spring has lifted off from the valve seating surface in order to open up the flow $F_{ACC}$ through the valve 40.

The mentioned first and/or second valves may also be controlled by the propulsion unit controller or governor as a function of the propulsion unit condition (acceleration, respectively, re-acceleration phase).

It is quite possible within the frame of the basic concept of the present invention, to construct the secondary channel 8 (FIG. 10) shortened as compared to FIG. 1 in which the secondary channel 8 extends over the entire propulsion unit length, and to fulfill nonetheless the tasks underlying the present invention to the full extent exist.

In the instant case (FIG. 10) the secondary channel terminates therefore approximately directly at the beginning of the turbine housing structure 10 of the low pressure turbine of the gas turbine jet propulsion unit which in this case, for example, has a diverging turbine housing structure 10.

According to the dash contour, it is also quite possible within the frame of the basic concept of the present invention to permit the secondary channel 8 to extend axially slightly further, i.e., to permit the secondary channel 8 to extend beyond the respective turbine housing structure 10.

In view thereof, the double-walled inner structure 12′ extends therefore in FIG. 10 from corresponding locally upstream take-off places (openings 34) beyond the secondary channel end as well as along the turbine housing structure 10 with inclusion of the air distributor and air guide chambers 33 and 36 integrated into the double-walled inner structure 12′ in the sense of FIG. 5; FIG. 10 can, of course, also be modified in the sense of FIGS. 4, 6 and 7.

Furthermore, in FIG. 10 first and second valves 39 and 50 are both provided in a propulsion unit and both are constructed in this embodiment as flap valves. As long as the impact cooling F is to be fully effective, the respective flap of the valve 50 always remains in the illustrated open position so that the used-up air $F_{ACC}$ can be blown out in this case, for example, directly into the atmosphere without being dependent on the hollow support blades 38 or the like mentioned, in particular, in conjunction with FIG. 1. The valve 39 is thereby closed.

The position indicated in dash line of the flaps 51 and 52 of the valves 39 and 50 represents the brief interference, respectively, interruption position of the highly efficient impact cooling F with the beginning of a propulsion unit acceleration phase by way of the interference air stream St supplied by way of the valve 39 from the secondary channel 8.

The counter-pressure build-up in the annular space 32 necessary for the interruption of the impact cooling F in accordance with the present invention presupposes that at least the one valve 39 readies a through-flow cross section into the annular space 32 which is dimensioned sufficiently large relative to the overall through-flow area of the impact cooling bores 11. The free overall through-flow cross section, for example, of the "rear" support blades 38 (FIG. 8)—be it whether or not valve flaps 42 are integrated therein—must be dimensioned so large that the desired impact cooling is not impaired.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A gas turbine jet propulsion unit including turbine guide blade support and cooling housing means, said housing means comprising:
   a first housing wall having turbine guide blade support hook means at one side thereof, and
   a second housing wall structurally supporting the first housing wall,
   said first and second housing walls being spaced from one another to form a cooling air chamber therebetween at a side of the first housing wall which is opposite the support hook means, said second housing wall having a plurality of impact cooling air bore means therethrough for accommodating a supply of cooling air to said cooling air chamber to directly cool said first housing wall,
   wherein the first housing wall extends axially over a plurality of guide blade sections and includes respective guide blade support hook means for each of said sections.

2. A propulsion unit according to claim 1, wherein the propulsion unit is of a multi-shaft-double flow construction and includes front compressor fan means driven by turbine means having the turbine guide blade support and cooling housing means, and wherein cooling air is supplied by said compressor fan means via a secondary channel means to said impact cooling air bore means in said second housing wall.

3. A propulsion unit according to claim 2, wherein said first and second housing walls extend around an engine rotational axis at a radial spacing from one another to form said cooling air chamber.

4. A propulsion unit according to claim 3, wherein said secondary channel means is an annular channel which surrounds said second housing wall.

5. A propulsion unit according to claim 4, wherein said secondary channel means extends axially over substantial portions of the length of the propulsion unit.

6. A propulsion unit according to claim 4, comprising a plurality of air distributor chamber means bounded on one side by the second housing wall and on the opposite side by a secondary channel means wall, said air distributor chamber means being disposed adjacent respective of said impact cooling air bores and serving to distribute cooling air from the secondary channel means to the respective impact cooling air bore means.

7. A propulsion unit according to claim 6, comprising a housing wall and the secondary channel means wall, said air distributor chamber means and the air guide chamber means being separated from one another and being disposed in alternating sequence around the circumference of the second housing wall, said air guide chamber means extending in bypassing relationship to the air distributor chamber means and being configured to guide fluid to a propulsion unit zone located downstream to a turbine guide blade support and cooling housing means.

8. A propulsion unit according to claim 7, wherein the secondary channel means contains opening means communicating the secondary channel means with the air distribution chamber means.

9. A propulsion unit according to claim 7, wherein at least one of the air guide chamber means and the air distributor chamber means are made of preformed profile strips continuously undulated in the circumferential direction which are constructed as spacer members between the secondary channel means and the second housing wall.

10. A propulsion unit according to claim 9, wherein the impact cooling bore means extend through sections of the profile strips forming the air distributor chamber means.

11. A propulsion unit according to claim 7, in which the first housing wall to be cooled has a contour which is relatively pronouncedly divergent in a direction of propulsion unit main flow, the secondary channel means wall defining a secondary air take-off and cooling section which is constructed wedge-shaped in that the respective second housing wall extends parallel to the divergent first housing wall while the respective secondary channel means extends parallel to the propulsion unit axis.

12. A propulsion unit according to claim 4, wherein a downstream end of the cooling air chamber is open to the atmosphere by way of air guide elements extending through the secondary channel means.

13. A propulsion unit according to claim 12, wherein the air guide elements are support blades.

14. A propulsion unit according to claim 4, comprising first valve means for selectively controlling the flow of cooling air from the secondary channel means into a radially outside surface of the second housing wall, whereby brief interruption of the supply of impact cooling air can be accomplished.

15. A propulsion unit according to claim 4, further comprising a valve connected downstream of the cooling air chamber for accommodating brief interruption of supply of impact cooling air against the housing wall by briefly closing cooling air discharge from the cooling air chamber.

16. A propulsion unit according to claim 4, comprising first and second valve means disposed at respective upstream and downstream ends of the cooling air chamber and valve control means for simultaneously opening the first valve means and closing the second valve means to maximize cooling air impact on the first housing wall.

17. A propulsion unit according to claim 13, wherein the cooling air chamber is constructed closed off downstream of the support blades.

18. A propulsion unit according to claim 16, wherein at least one of the first and second valve means is constructed as an annular slide valve.

19. A propulsion unit according to claim 16, wherein at least one of the first and second valve means is constructed as a spring disk valve.

20. A propulsion unit according to claim 16, wherein at least one of the first and second valve means is constructed as a flap valve.

21. A propulsion unit according to claim 20, wherein the second valve means are integrated into an air guide element and possess a closure valve profile matched to an inner contour of the air guide element.

22. A propulsion unit according to claim 16, wherein the second valve means are constructed and arranged in a tubular guide means laterally extending adjoining a respective turbine guide blade support element extending through the cooling air chamber to connect the cooling air chamber with the atmosphere.

23. A propulsion unit according claim 16, wherein at least one of the first and second valve means is controllable as a function of the propulsion unit operating condition.

24. A propulsion unit according to claim 4, wherein the secondary channel wall means and the second housing wall extend from local locations for direct take-off of the secondary cooling air component out of secondary air flow and along the first turbine housing wall to be cooled with inclusion of at least one of air distributor chamber means and air guide chamber means integrated into the annular space between the second housing wall and the secondary channel means wall.

25. A propulsion unit according to claim 1, wherein the first housing wall belongs to at least one of a high pressure and low pressure turbine.

26. A propulsion unit according to claim 1, comprising air distributor chamber means and air guide chamber means which are separated from one another and disposed on a side of the second housing wall facing away from the cooling air chamber. secondary channel means includes a wall containing opening means leading to a space adjacent the impact bore means of the second housing wall.

27. A propulsion unit according to claim 26, wherein at least one of the respective air guide chamber means and air distributor chamber means are made of preformed profile strips continuously undulated in a circumferential direction around the propulsion unit, said profile strips being constructed as spacer members between a second channel means wall and the second housing wall.

28. A propulsion unit according to claim 14, wherein a second valve means connected downstream of the cooling air chamber is provided for brief interruption of the impact cooling air by an also brief closure of the cooling air discharge out of the cooling air space.

29. A propulsion unit according to claim 1, wherein said cooling air bore means are aligned with respective locations of the first housing wall where the support hook means are located.

30. A gas turbine jet propulsion unit including turbine guide blade support and cooling housing means, said housing means comprising:
   a first housing wall having turbine guide blade support hook means at one side thereof, and
   a second housing wall structure supporting the first housing wall,
   said first and second housing walls being spaced from one another to form a cooling air chamber therebetween at a side of the first housing wall which is opposite the support hook means, said second housing wall having a plurality of impact cooling air bore means therethrough for accommodating a supply of cooling air to said cooling air chamber to directly cool said first housing wall,
   wherein the propulsion unit is of a multi-shaft-double flow construction and includes front compressor fan means driven by turbine means having the turbine guide blade support and cooling housing means, wherein cooling air is supplied by said compressor fan means via a secondary channel means to said impact cooling air bore means in said second housing wall, and
   wherein the secondary channel means includes a wall containing opening means leading to a space adjacent the impact bore means of the second housing wall.

31. A propulsion unit according to claim 30, in which the first housing wall to be cooled has a contour which is relatively pronouncedly divergent in a direction of propulsion unit main flow, the secondary channel means wall defining a secondary air take-off and cooling section which is constructed wedge-shaped in that the respective second housing wall extends parallel to the divergent first housing wall while the respective secondary channel means extends parallel to the propulsion unit axis.

32. A propulsion unit according to claim 30, wherein said cooling air bore means are aligned with respective locations of the first housing wall where the support hook means are located.

* * * * *